Feb. 20, 1962 W. F. BERCK 3,021,684
METERING SYSTEM FOR LIQUEFIED GASES
Filed Nov. 18, 1958

INVENTOR.
WILLIAM F. BERCK
BY
Mellin and Hanscom
ATTORNEYS 3,021,684
METERING SYSTEM FOR LIQUEFIED GASES
William F. Berck, Hayward, Calif., assignor to Ralph N. Brodie Company, San Leandro, Calif., a corporation of California
Filed Nov. 18, 1958, Ser. No. 774,670
7 Claims. (Cl. 62—49)

This invention relates to apparatus for metering liquefied gases, whereby means is provided to check the flow in the metered flowline. The system is to be used primarily with liquefied petroleum gas systems to prevent error in registration of a liquid meter when pumping from an empty supply tank.

Liquefied petroleum products, as well as other liquefied gases, have a vapor pressure lower than atmospheric pressure. To measure the liquid volume of these products, it is essential that they be kept constantly under a pressure in excess of their respective vapor pressure. The products are thereby retained in a liquid state and no vapor volumes are present to introduce errors in the metering registration. To this end, it is common practice to use a differential pressure valve immediately adjacent the downstream side of the liquid meter. While this differential valve may be constructed in several different ways, it is primarily designed so that the vapor phase pressure of the liquid must be exceeded before the valve will permit any flow. Prior art systems also include a suction pump which draws fluid into the flowline and forces it through the meter against the back pressure provided by the differential valve.

It is possible that if some gas were drawn into prior art systems it would be changed to liquid before passing through the meter. But, recompression of gases into liquid is not an instantaneous occurrence. It can be readily demonstrated that some entrained gas may pass through the pump and metering system so rapidly that, even though the pressures encountered are greatly in excess of the vapor pressure of the product, the gases will not recompress into liquid. The volumetric measurement will then be in error.

Placing a very heavy spring bias on the differential valve will aid in recompression and, thereby, reduce error attributable to registered gaseous volumes. It is conceivable that the spring pressure could be increased to the point that no error would exist. However, an increase in the spring pressure will require additional pump pressure to open the valve and maintain flow. Sizes and capacities of pumps are limited by many economic and installation factors and so the complete elimination of gases by this method is impractical.

It is one object of this invention to provide apparatus which will positively close off the flow in the flowline if abnormal amounts of gaseous product are forced into the flowline, such as would occur upon exhausting the source of liquefied gas.

It is another object of this invention to provide a means responsive to a predetermined amount of unliquefied gas entering the flowline for stopping further liquid flow.

A third object of this invention is to provide a valve means in the metering flowline which is biased closed with pressure sufficient to retain the metered product in a liquefied state, but may be positively closed if an abnormal amount of unliquefied gas enters the flowline.

Another object is to provide pressure responsive means including a shuttle valve which functions to connect a source of operating fluid to a valve means, whereby if the pressure in a metered flowline falls below a predetermined level the valve means will be operated to a closed position and prevent further flow in the flowline.

Other objects and advantages of this invention will be suggested by the description and drawings.

Figure 1:
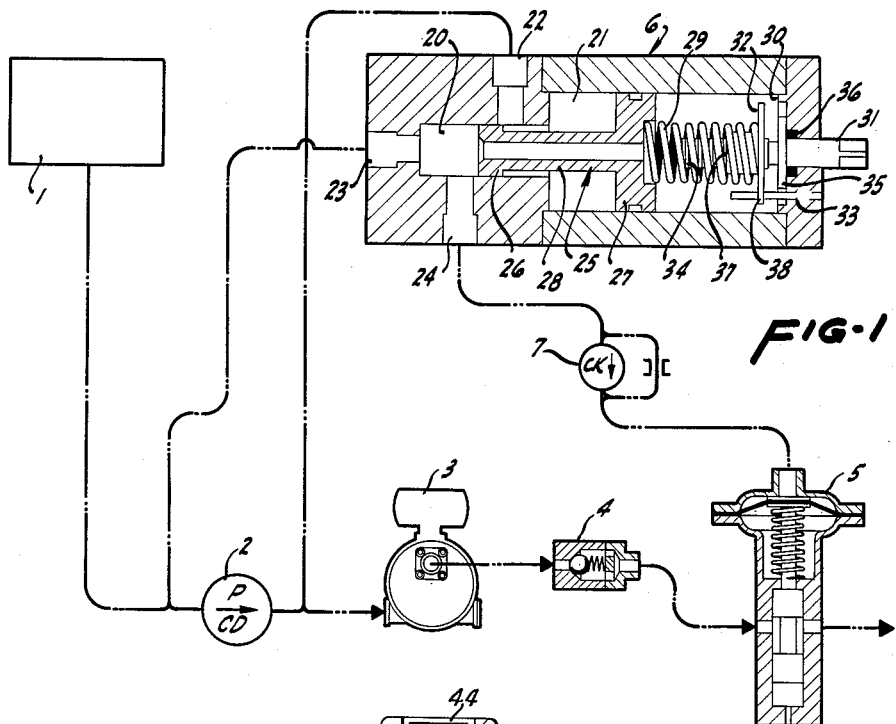
FIG. 1 is a partly schematic illustration of the flow system herein described, showing the interrelationships of the various apparatus.

Referring to FIG. 1 of the drawings, the liquefied gas which is to be metered is drawn from a pressurized supply tank 1 by a pump 2 and is forced through a flowline which includes a meter 3, a pressure differential valve 4, and a shut-off valve 5. As will be explained subsequently, and with particular reference to FIG. 2, valves 4 and 5 may be combined in a preferred form of apparatus. A pressure responsive operating means 6 and 7 functions to connect the high pressure side of the pump to the valve means 5 if the pressure therein falls below a predetermined level. A more detailed description of the structure and operation of each of these devices will follow.

Fluid pumps characteristically lose efficiency when air or entrained gases are acted upon, and this is true for even the most efficient designs available today. The loss in efficiency is attributable to the difference in viscosity between the solid liquid and liquid with entrained gases. A change in the viscosity results in a change in the slippage characteristic of hte pump and, hence, also its efficiency. Since there is more slippage when entrained gas enters the pump, the efficiency correspondingly decreases and the pressure output immediately drops.

Pump 2, therefore, detects the amount of gas passing into the flowline and the output pressure varies accordingly. If the percentage of unliquefied gas increases, the efficiency and output pressure of the pump decreases. The resulting decrease change in flowline pressure is detected by the pressure responsive operating means 6 and 7 which, in turn, actuates the valve means 5 to its closed position.

A pressure differential valve 4 is utilized to provide sufficient back pressure in the metering flowline to retain the product in a liquid state. Spring biased check valves, such as those used in prior art devices, can be employed, but since this valve is not to be used for recompression and changing the product's state from gas to liquid, less back pressure is required and a weaker spring bias may be utilized.

The operating means is responsive to a predetermined level of pressure in the flowline and comprises a pressure-sensitive shuttle valve 6 and a flow control valve 7. In combination with pump 2, which detects the quality of fluid, the operating means and pump consist of a means responsive to a predetermined amount of unliquefied gas to operate the valve means 5.

Shuttle valve 6 comprises a housing having a first cylindrical chamber 20 and a second cylindrical chamber 21, said chambers being axially connected to form a continuous fluid passageway. Three passages 22, 23 and 24 are also formed in the housing, each passage connecting with chamber 20 from without and opening into the chamber at spaced axial distances.

A tubular valve element 25, which defines an inner conduit, is disposed in the housing with a first cylindrical head portion 26 slidably mounted in chamber 20. A second cylindrical head portion 27 is slidably mounted in chamber 21 and is connected to the first head portion by a reduced body portion 28. The head portion 27 being much larger than head portion 26, fluid pressure entering passage 22 from the pressurized flowline will exert greater force on the larger head and tend to drive the valve element into chamber 21. However, a spring biasing means 29, comprising a coiled spring, as shown, is disposed near the inner end 30 of the chamber 21 and is compressed between the head portion 27 and a spring adjusting means.

The adjusting means is mounted in the inner end 30 and comprises a rotatable shaft 31, a spring seating plate 32, and a rotational restraining pin 33. The shaft is supported on the housing, one end accessible from without and the other end projecting axially into the second chamber and provided with a threaded portion 34. A disk collar 35 is formed integrally with the shaft, or, in the alternative, may be rigidly connected thereto, limiting outward axial movement of the shaft. Between collar 35 and inner end 30 is a sealing means 36 which prevents the escape of fluid and loss of fluid pressure.

Spring seating plate 32 is formed like a collar and has a threaded hole 37 mating with the threaded portion 34 on the shaft. In addition, an opening 38 is provided in the plate for receiving the rotational restraining pin which protrudes from the housing into the second chamber.

In operation, the spring of this shuttle valve is adjusted by rotating the shaft 31. Since the seating plate is restrained from rotational movement by pin 33, the mating threads of plate and shaft cooperate to extend or retract the seating plate in an axial direction and thereby perform adjustments on the compression spring 29. Adjustment is made to position the valve element 25 as shown in FIG. 1 under normal conditions.

With pump 2 supplying its normal pressure, the valve element 25 is balanced in the position shown in FIG. 1, passage 24 then being in open communication with passage 23. Since passages 24 and 23 are respectively connected to flow control valve 7 and the suction side of the pump, the fluid pressure used to operate the valve 5 to close is vented to the low pressure side of the flowline. If the fluid pressure source applied via passage 22 is decreased below a predetermined level, the spring bias 29 overcomes the force of liquid pressure and moves the valve element 25 to the left until head portion 26 abuts passage 23. If the valve element occupies such a position, the flowline pressure would be directed from passage 22 into chamber 20; fluid would circulate about the reduced body portion 28 and be applied through passage 24 to operate valve 5 to its closed position.

It will be noted that the tubular valve element is constructed without seals of any sort in order that it will move freely and very quickly under small changes in pressure. The slippage which occurs across head portion 27 drains back through the center of the valve element to the suction side of the pump. The small amount of fluid which passes between head portion 26 and chamber 20 drains directly into the suction passage 23.

The flow control valve 7 is of conventional design, its purpose being to allow a free flow of fluid toward the valve means 5 but to restrict the outflow of fluid therefrom. As will be more fully explained below, it is not desirable to have valve 5 open too quickly after it has once been operated closed. Therefore, valve 7 restricts the return flow and delays its opening. A flow control valve which is satisfactory for this purpose is manufactured by Modernair, 400 Preda Street, San Leandro, California.

Figure 2:
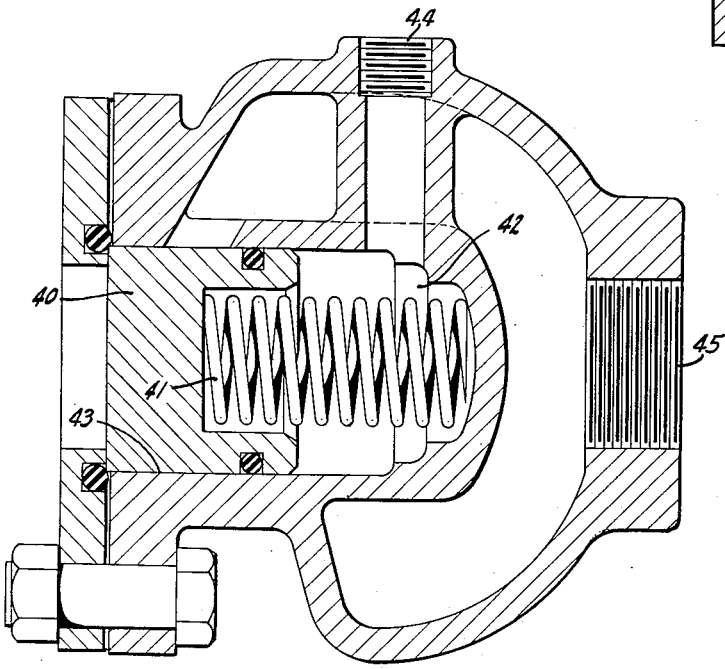
FIG. 2 is a drawing of a differential valve structure to be used in the metering system in lieu of valves 4 and 5 of FIG. 1.

Valve means 5 is actuated by the fluid pressure supplied through the operating means 6 and 7, and since this valve is to be tight seating, it will positively shut off flow therethrough upon being actuated to its closed position. A differential valve device which combines the functions of valves 4 and 5 may be used in a preferred form, as shown in FIG. 2. This valve is operated between open and closed positions by the unbalance of pressures exerted upon the piston 40 by a biasing means 41, fluid pressure in chamber 42 (controlled by the operating means 6 and 7), and the flowline pressure on the piston head. Accordingly, it should be apparent that opening 43 of the differential valve would be connected to the downstream side of meter 3, threaded opening 44 being connected to check valve 7, and threaded opening 45 being connected to a discharge pipe line. The detailed construction of this valve device is not considered to be part of this invention, and differential valve devices of a similar construction could also be utilized, such as the one described in U.S. Patent No. 2,841,359.

A complete operation of the metering system having the valve device shown in FIG. 2 connected as indicated above is as follows:

When pump 2 is full of solid liquid and is operating at its rated pressure for this installation, the shuttle valve is positioned as shown in FIG. 1, whereby chamber 42 is vented to the suction side of the pump through the restricted side of the flow control valve 7, through passage 24, and out passage 23. A differential pressure across the piston overpowers the spring bias and opens the valve, permitting a metered flow of fluid. If the supply of liquefied gas in tank 1 is exhausted, or whenever a predetermined qualitative amount of gaseous product enters the pump, the efficiency of the pump changes, as described above, and results in a reduction in flowline pressure. Even a small amount of gas will produce a pressure drop of two to four pounds; and since the shuttle valve 6 is sensitive to small changes in pressure, it responds instantly and spring 29 moves valve member 25 to the left, placing head portion 26 between the openings of passages 23 and 24. The flowline pressure is then transmitted from passage 22 to passage 24, through the free passage portion of flow control valve 7 and into the operating chamber 42. The fluid pressures on either side of piston 40 balance and the bias means 41 rapidly closes the valve piston. This sequence of operation transpires before any gaseous product passes into the meter.

In cases where the tank supply has been emptied, the inlet of the pump may be switched to a full tank or the presently connected tank may be refilled. When liquid is again introduced at the inlet of the pump, the pump develops enough efficiency to recompress the small amount of gas in the system to liquid. Pressure builds up to a point sufficient to move the shuttle valve and allow the pressure from chamber 42 to be bled off, as previously described. But, since the bleeding of the fluid must pass through the restricted portion of flow control valve 7, opening of valve 5 is retarded. If this valve were permitted to open the instant the predetermined operating pressure were reached, some gaseous product might pass into the meter before it is recompressed and liquefied. By retarding the opening of valve 5, the flowline pressure is raised above the normal metering pressure maintained by the pressure differential valve 4 and the entrained gas is liquefied. When valve 5 finally opens, the pressure is reduced to the back pressure maintained by valve 4 or the spring bias 41 which is only sufficient to retain the metered product in a liquid state.

After considering the embodiments described herein, persons skilled in the art will understand that variations may be made without departing from the principles disclosed; and, the use of any structures or arrangements that are properly within the scope of the appended claims is contemplated.

Having thus described my invention, what I claim and desire to secure by Letters Patent is:

1. In a metering system for liquefied gases, the combination comprising a flowline having a meter therein; a source of liquefied gas held under pressure; a valve means connected in said flowline and operative between open and closed positions by a source of operating fluid; means including a shuttle valve responsive to a predetermined flowline pressure upstream of said meter for connecting said source of operating fluid to said valve means, whereby upon a decrease in pressure below a predetermined level said valve means will be operated to its closed position.

2. In a metering system for liquefied gases, the combination comprising a flowline having a meter therein; a source of liquefied gas held under pressure; a pump connected between said meter and said source for feeding said liquefied gas into said metering flowline; a valve means connected in said flowline downstream of said meter, said valve means having a valve element directed against the upstream pressure in said flowline and being operative between open and closed positions by a source of operating fluid; means biasing said valve element closed, thereby providing a back pressure to keep said gas liquefied; a shuttle valve responsive to flowline pressure between said meter and said pump for connecting said source of operating fluid to said valve means, whereby upon a decrease in flowline pressure below a predetermined level said valve means will be operated to its closed position.

3. In a metering system for liquefied gases, the combination comprising a flowline having a meter therein; a source of liquefied gas held under pressure; a valve means connected in said flowline and operative between open and closed positions by a source of operating fluid; a shuttle valve responsive to flowline pressure upstream of said meter for connecting said source of operating fluid to said valve means, whereby upon a decrease in pressure below a predetermined level said valve means will be operated to its closed position; and a flow control valve connected in the pressure line between said shuttle valve and said valve means, said flow control valve permitting a free transmission of fluid pressure in the direction of said valve means but restricting the release of pressure therefrom.

4. In a metering system for liquefied gases, the combination comprising a flowline having a meter therein; a source of liquefied gas held under pressure; a pump connected between said meter and said source for feeding said liquefied gas into said metering flowline; a valve means connected in said flowline downstream of said meter, said valve means having a valve element directed against the upstream pressure in said flowline and being operative between open and closed positions by a source of operating fluid; means biasing said valve element closed, thereby providing a back pressure to keep said gas liquefied; a shuttle valve responsive to flowline pressure between said meter and said pump for connecting said source of operating fluid to said valve means, whereby upon a decrease in flowline pressure below a predetermined level said valve means will be operated to its closed position; and a flow control valve connected in the pressure line between said shuttle valve and said valve means, said flow control valve permitting a free transmission of fluid pressure in the direction of said valve means but restricting the release of pressure therefrom.

5. In a metering system for volatile liquids the combination comprising: a source of liquefied gas held under pressure; a flowline in fluid communication with said source and having a pump and a meter therein, said meter being downstream of said pump; means in said flowline downstream of said pump for applying a back pressure to keep said gas liquefied; a shut-off valve connected in said flowline downstream of said pump for inhibiting fluid flow through said meter; pressure sensitive and fluid operated means for actuating said shut-off valve between open and closed positions; a conduit means fluidly communicating said fluid operated means to said flowline at a point downstream of said pump for transmitting fluid pressure from said point to said fluid operated means; control valve means connected in said conduit means for selectively transmitting the flowline pressure at said point to said pressure sensitive means; means responsive to the presence of a predetermined amount of unliquefied gas in the flowline between said pump and said meter for opening said control valve means and closing said shut-off valve.

6. A system as set forth in claim 5 and further comprising means for bleeding said fluid operated means to the upstream side of said pump, said means including a conduit having a greater fluid flow resistance than the conduit means connecting said shut-off valve operator to said flowline at the point downstream of said pump and upstream of said meter.

7. A system as set forth in claim 5 wherein said shut-off valve includes a valve element directed against the upstream pressure in said flowline, said valve element being acted upon by said back pressure applying means with sufficient pressure for keeping metered gas liquefied.

References Cited in the file of this patent
UNITED STATES PATENTS

| | | |
|---|---|---|
| 2,049,239 | Wilcox | July 28, 1936 |
| 2,291,678 | Benz et al. | Aug. 4, 1942 |
| 2,362,724 | Shea | Nov. 14, 1944 |
| 2,610,471 | Thayer | Sept. 16, 1952 |
| 2,728,196 | Bowser | Dec. 27, 1955 |
| 2,753,692 | Dickieson | July 10, 1956 |
| 2,922,288 | Delaney | Jan. 26, 1960 |